(12) United States Patent
Stojanovski et al.

(10) Patent No.: US 10,070,357 B2
(45) Date of Patent: Sep. 4, 2018

(54) SMOOTH UE TRANSFER WITHIN AN EVOLVED PACKET CORE

(71) Applicant: Intel IP Corporation, Santa Clara, CA (US)

(72) Inventors: Alexandre Stojanovski, Paris (FR); Puneet Jain, Hillsboro, OR (US); Muthaiah Venkatachalam, Beaverton, OR (US)

(73) Assignee: Intel IP Corporation, Santa Clara, CA (US)

(*) Notice: Subject to any disclaimer, the term of this patent is extended or adjusted under 35 U.S.C. 154(b) by 382 days.

(21) Appl. No.: 14/671,829

(22) Filed: Mar. 27, 2015

(65) Prior Publication Data

US 2016/0095036 A1   Mar. 31, 2016

Related U.S. Application Data

(60) Provisional application No. 62/055,593, filed on Sep. 25, 2014, provisional application No. 62/060,951, filed on Oct. 7, 2014.

(51) Int. Cl.
*H04W 36/18* (2009.01)
*H04W 76/11* (2018.01)
(Continued)

(52) U.S. Cl.
CPC ............ *H04W 36/18* (2013.01); *H04W 4/08* (2013.01); *H04W 36/0033* (2013.01); *H04W 36/12* (2013.01); *H04W 76/021* (2013.01); *H04W 76/11* (2018.02); *H04W 88/16* (2013.01)

(58) Field of Classification Search
CPC .... H04W 36/18; H04W 4/08; H04W 36/0033
See application file for complete search history.

(56) References Cited

U.S. PATENT DOCUMENTS

2012/0214492 A1* 8/2012 Mihaly ............... H04W 76/041
                                                                455/437
2012/0230289 A1* 9/2012 Olsson ............. H04W 36/0011
                                                                370/329
(Continued)

FOREIGN PATENT DOCUMENTS

EP       2034791 A1    3/2009
EP       2161963 A1    3/2010
WO    2013048193 A1    4/2013

OTHER PUBLICATIONS

International Search Report and Written Opinion of corresponding PCT Application PCT/US15/36251 dated Jan. 13, 2016.

(Continued)

*Primary Examiner* — Derrick Ferris
*Assistant Examiner* — Kevin Lee
(74) *Attorney, Agent, or Firm* — Ledell Ansari, LLP

(57) ABSTRACT

Techniques described herein may enable Evolved Packet Core (EPC) devices (e.g., Mobility Management Entities (MMEs), Serving Gateways (SGWs), or Packet Data Network Gateways (PGWs)) to transfer a connection with a User Equipment (UE) from one EPC device to another EPC device without a break in service for the UE. The transfer may occur in response to an EPC device being overloaded, an EPC device being added or removed from a logical group of EPC devices, or in response one EPC device becoming more appropriate for the UE than another EPC device (e.g., due to a change in the geographic location of the UE). EPC devices may be implemented as virtual network functions, and the transfer of the UE may occur while the UE is in an active mode or an idle mode.

26 Claims, 11 Drawing Sheets

(51) Int. Cl.
| | |
|---|---|
| *H04W 4/08* | (2009.01) |
| *H04W 36/00* | (2009.01) |
| *H04W 76/02* | (2009.01) |
| *H04W 88/16* | (2009.01) |
| *H04W 36/12* | (2009.01) |

(56) References Cited

U.S. PATENT DOCUMENTS

| | | | |
|---|---|---|---|
| 2013/0246564 A1* | 9/2013 | Lee | H04L 67/2842 709/217 |
| 2017/0034749 A1* | 2/2017 | Chandramouli | H04W 4/22 |
| 2017/0195926 A1* | 7/2017 | Iwai | H04W 36/12 |

OTHER PUBLICATIONS

"3rd Generation Partnership Project; Technical Specification Group Core Network and Terminals; 3GPP Evolved Packet System: CT WG4 Aspects (Stage3); Release 8", 29803-090, Jun. 2008.

Mitsubishi Electric, "Early MME relocation for idle mode mobility", 3GPP Draft; S2-073218, Aug. 2007 (http://www.3gpp.org/ftp/tsg_sa/WG2_Arch/TSGS2_59_Helsinki/Docs).

TS 36.331 v12.3.0; "3rd Generation Partnership Project; Technical Specification Group Radio Access Network; Evolved Universal Terrestrial Radio Access (E-UTRA); Radio Resource Control (RRC); Protocol specification (Release 12)", Sep. 23, 2014.

TS 23.401 v13.0.0; "3rd Generation Partnership Project; Technical Specification Group Services and System Aspects; General Packet Radio Service (GPRS) enhancements for Evolved Universal Terrestrial Radio Access Network (E-UTRAN) access (Release 13)", Sep. 22, 2014.

TS 23.301 v12.5.0; "3rd Generation Partnership Project; Technical Specification Group Core Network and Terminals; Non-Access-Stratum (NAS) protocol for Evolved Packet System (EPS); Stage 3 (Release 12)", Jun. 27, 2014.

* cited by examiner

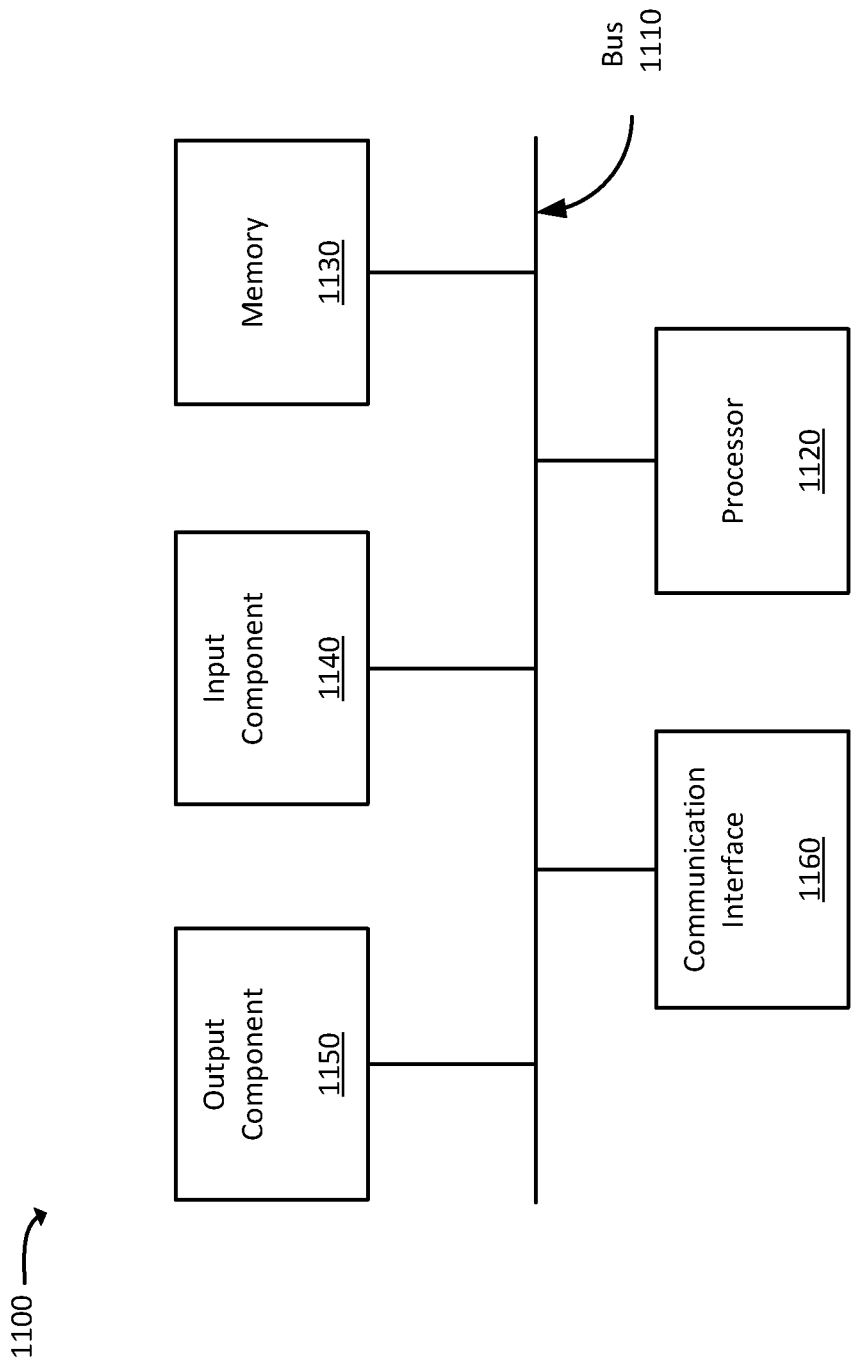

SMOOTH UE TRANSFER WITHIN AN EVOLVED PACKET CORE

RELATED APPLICATIONS

The present application claims the benefit of U.S. Provisional Patent Application No. 62/055,593, which was filed on Sep. 25, 2014, and which is hereby incorporated by reference as though fully set forth herein. The present application also claims the benefit of U.S. Provisional Patent Application No. 62/060,951, which was filed on Oct. 7, 2014, and which is hereby incorporated by reference as though fully set forth herein.

BACKGROUND

3rd Generation Partnership Project (3GPP) Evolved Packet Core (EPC) architectures include Mobility Management Entities (MMEs), Serving Gateways (SGWs), and Packet Data Network Gateways (PGWs) (referred to herein generally as EPC devices). EPC devices may be organized into collaborative pools or groups in order to accommodate the demands for service from User Equipment (UEs) within a service area. For instance, a group of MMEs may support a particular service area of a wireless network such that UEs within the service area may be supported by any MME within the MME group. UEs may also be supported in a similar manner by groups of SGWs and pools of PGWs.

On occasion, there may be a need to transfer a connection associated with a UE from one EPC device to another EPC device. For example, one MME may become more appropriate to service a particular UE (e.g., because of a change in the geographic location of the UE) than the MME currently serving the UE and one or more procedures may be performed in order to transfer the connection with the UE to the more appropriate MME. As another example, in response to an SGW being added to a group of SGWs (e.g., in order to keep up with the demand for service from UEs) the connections associated with some UEs being serviced by the SGW group may be offloaded to the newly added SGW. In yet another example, a UE being serviced by one PGW in a PGW group may be reassigned to another PGW within the group when it becomes more appropriate for the other PGW to service the UE, which may occur when the UE begins using bandwidth above a certain usage threshold.

Transferring a connection associated with a UE from one EPC device to another EPC device may involve a break in service where the connection between the UE and the wireless network is terminated and then reestablished in order for the UE to connect with the new EPC device.

BRIEF DESCRIPTION OF THE DRAWINGS

Embodiments of the present invention will be readily understood by the following detailed description in conjunction with the accompanying drawings. To facilitate this description, like reference numerals may designate like structural elements. Embodiments of the invention are illustrated by way of example and not by way of limitation in the figures of the accompanying drawings.

FIG. 11 is a diagram of example components of a device.

DETAILED DESCRIPTION OF PREFERRED EMBODIMENTS

Figure 1:
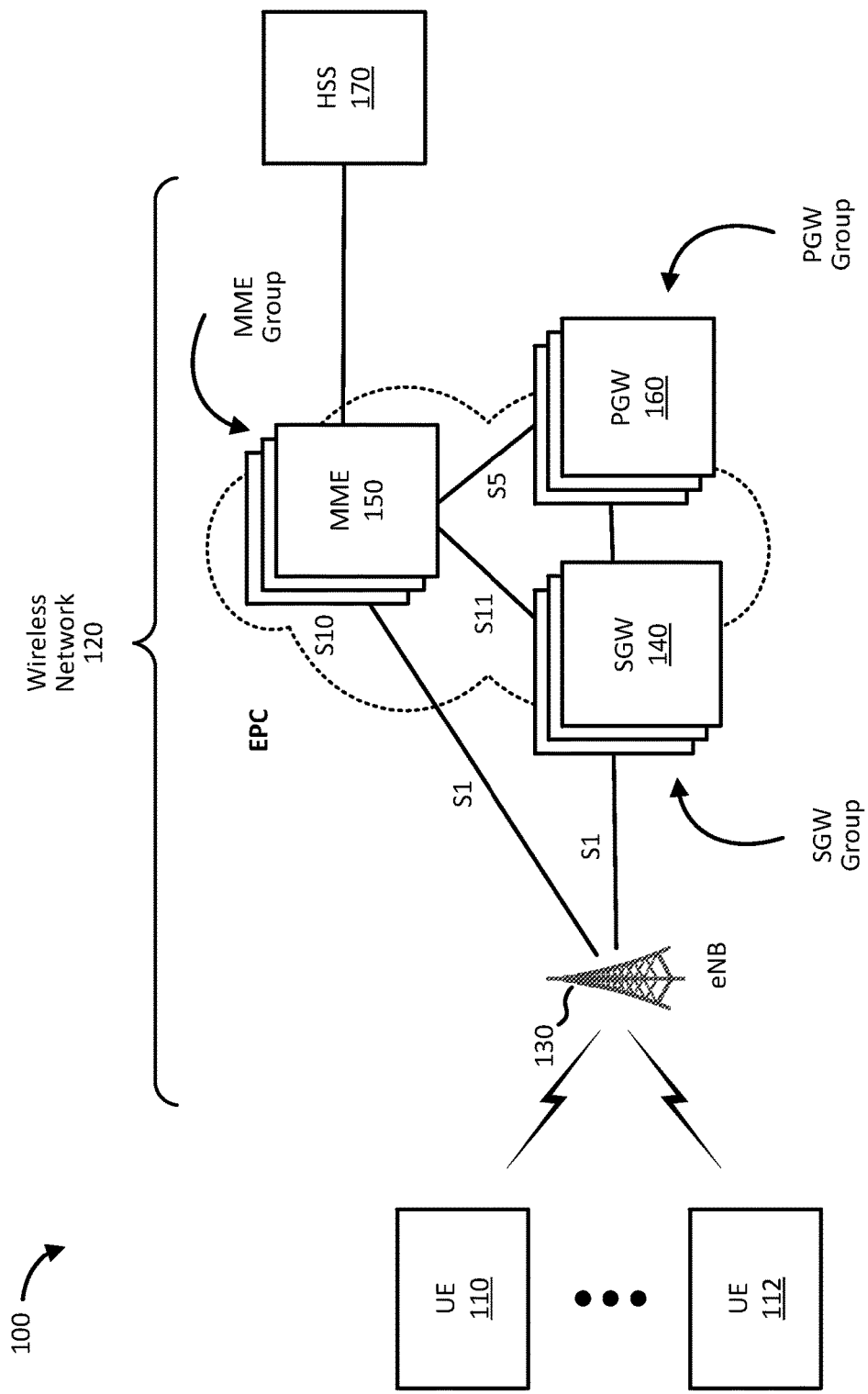
FIG. 1 is a diagram of an example environment in which systems and/or methods described herein may be implemented.

The following detailed description refers to the accompanying drawings. The same reference numbers in different drawings may identify the same or similar elements. It is to be understood that other embodiments may be utilized and structural or logical changes may be made without departing from the scope of the present disclosure. Therefore, the following detailed description is not to be taken in a limiting sense, and the scope of embodiments in accordance with the present invention is defined by the appended claims and their equivalents.

Techniques described herein may enable Evolved Packet Core (EPC) devices (e.g., Mobility Management Entities (MMEs), Serving Gateways (SGWs), or Packet Data Network Gateways (PGWs)) to transfer a connection with a User Equipment (UE) without a break in service for the UE. A procedure for transferring a connection with a UE without breaking service is referred to herein as a smooth load rebalancing procedure.

As an example of such a procedure, a UE may be connected to an MME of a group of MMEs upon completing an attachment procedure with a wireless cellular network. At some point, the MME serving the UE may determine (e.g., based on geographic movements of the UE within the service area, a new MME being added to the MME group, etc.) that another MME within the group is more appropriate for the UE. In response, the MME serving the UE (also referred to as the source MME) may initiate a smooth load rebalancing procedure by sending a relocation request to the more appropriate MME (also referred to as the target MME) along with connection context information (e.g., security keys, etc.) for establishing the connection within the target MME.

The target MME may respond with information that identifies the UE and the target MME. The source MME may send an MME reallocation request with the identification information to the UE (e.g., via an Enhanced Node B (eNB) serving the UE) and a response to the MME reallocation request will eventually be received by the target MME (instead of the source MME). The target MME may then form associations with the SGW serving the UE and inform a home subscriber server (HSS) of the UE regarding the change in MMEs. As such, by providing connection context information to the target MME and by using an MME reallocation request that identifies the UE and the target MME, a connection with an UE may be transferred from one MME to another MME without causing a break in service for the UE.

The description provided herein includes techniques for performing a smooth load rebalancing procedure in addition to the example provided above. Some of these additional techniques include scenarios where the connection with the UE is transferred from one MME to another MME while in an idle mode. Other techniques described herein include connection transfers to and from other EPC devices, such as SGWs or PGWs.

In one implementation, a Mobility Management Entity (MME) comprises processing circuitry to establish a connection, via an Enhanced Node B (eNB), between a User Equipment (UE) and a wireless cellular network; detect a need to transfer the connection to another MME within the wireless cellular network; send, to the other MME, a request to transfer the connection and context information for establishing the connection; receive, from the other MME and in response to the request, a temporary identifier for the UE and an identifier for the other MME; and communicate, to the eNB, an indication to transfer the connection, associated with the UE, from the MME to the other MME, the indication including the new temporary identifier for the UE and the identifier for the other MME.

In some implementations, the temporary identifier and the identifier for the other MME are received by the MME as a System Architecture Evolved (SAE) Temporary Mobile Subscriber Identity (S-TMSI). Additionally, or alternatively, the indication to transfer the connection is an S1-AP (S1 Application Protocol) message that is used to communicate, to the eNB, the identifier for the other MME, including an encapsulated Globally Unique Temporary Identity (GUTI) REALLOCATION REQUEST message that is used to communicate, to the UE, the temporary identifier and the identifier for the other MME. In certain implementations, the processing circuitry may also be to determine that the UE is in an idle mode, and communicate, to the eNB, the temporary identifier and the identifier for the other MME as part of an idle mode paging procedure directed toward the UE.

In some implementations, the MME and the other MME are part of a logical group of MMEs within the wireless cellular network. In certain implementations, the need to transfer the management of the UE to the other MME is based on a change in a geographical location of the UE within the wireless cellular network, a quantity of UEs currently managed by the MME, a change in an availability of the MME within a group of MMEs, a change in a quantity of MMEs within the group of MMEs, or a change in a processing capacity allocated to the MME.

Additionally, or alternatively, the MME and the other MME each include a virtual MME installed on one or more physical server devices. In some implementations, the indication to transfer the connection from the MME to the other MME is to cause the eNB to notify the UE of the temporary identifier and to relay, based on the identifier of the other MME, communications from the UE to the other MME.

In another implementation a Mobility Management Entity (MME) comprises a computer-readable medium to store processor-executable instructions; and processing circuitry to execute the processor executable instructions to: receive, from another MME, a request to manage a connection between a User Equipment (UE) and a wireless network via an Enhanced Node B (eNB); create, in response to the request from the other MME, a temporary identifier for the UE; communicate, to the eNB connected to the UE, the temporary identifier for the UE and an identifier for the MME; and receive, from the eNB and in response to communicating the temporary identifier for the UE and the identifier for the MME, a message confirming that the UE has acknowledged the temporary identifier.

In another implementations, a method, implemented by a Mobility Management Entity (MME), comprises establishing a connection, via an Enhanced Node B (eNB), between a User Equipment (UE) and a wireless cellular network; detecting that the UE is in an idle mode; detecting, while the UE is in the idle mode, a need to transfer the connection to another MME within the wireless cellular network; and sending, in response to detecting that the UE is in the idle mode and in response to detecting the need to transfer the connection, a paging request message to the UE via the eNB, the paging request message including an identifier of the UE device; wherein the paging request message is to cause the UE to complete the transfer of the connection to the other MME by initiating a Tracking Area Update (TAU) procedure that is based on the identifier of the other MME.

In yet another implementation, a Packet Data Network Gateway (PGW) device comprises means for detecting a need to offload one or more connections, between User Equipments (UEs) and the PGW, to another PGW; means for collecting, in response to the need to offload the connection, identifiers of the UEs associated with the connections; and means for communicating a relocation request to a Serving Gateway (SGW) serving the UEs, the relocation request message including the identifiers of the one or more UEs; wherein the relocation request is to cause the SGW to initiate a load-rebalancing procedure, via a Mobility Management Entity (MME) device, to cause the one or more UEs to be offloaded to the other PGW based on the identifiers of the UEs.

In another implementation, a Packet Data Network Gateway (PGW) comprises processing circuitry to detect a need to offload one or more connections, between User Equipments (UEs) and the PGW, to another PGW; collect, in response to the need to offload the connection, identifiers of the UEs associated with the connections; and communicate a relocation request to a Serving Gateway (SGW) serving the UEs, the relocation request including the identifiers of the one or more UEs; wherein the relocation request is to cause the SGW to initiate a load-rebalancing procedure, via a Mobility Management Entity (MME) device, to cause the one or more UEs to be offloaded to the other PGW based on the identifiers of the UEs.

FIG. 1 is a diagram of an example environment 100 in which systems and/or methods described herein may be implemented. Environment 100 may include UE devices 110 and 112, and wireless network 120.

In FIG. 1, wireless network 120 may include an Evolved Packet System (EPS) that includes a Long-Term Evolution (LTE) network and/or an evolved packet core (EPC) network that operates based on a 3rd Generation Partnership Project (3GPP) wireless communication standard. The LTE network may be, or may include, a radio access network that includes one or more base stations, some or all of which may take the form of an Enhanced Node B (eNB) 130, via which UEs 110 and 112 may communicate with the EPC network. The EPC network may include one or more Serving Gateways (SGWs) 140, Mobility Management Entities (MMEs) 150, and/or Packet Data Network Gateways (PGWs) 160. The EPC network may enable UEs 110 and 112 to communicate with an external network. Additionally, wireless network 120 may include a Home Subscriber Server (HSS) 170.

UEs 110 and 112 may each include a portable computing and communication devices, such as a personal digital assistant (PDA), a smart phone, a cellular phone, a laptop computer with connectivity to a cellular wireless network, a tablet computer, etc. UEs 110 and 112 may also include non-portable computing devices, such as desktop computers, consumer or business appliances, or other devices that have the ability to connect to wireless network 120. UEs 110 and 112 may connect, through a radio link, to wireless network 120.

eNB 130 may include one or more network devices that receive, process, and/or transmit traffic destined for and/or received from UEs 110 and 112. SGW 140 may include one or more network devices that route data of a traffic flow.

SGW 140 may aggregate traffic received from one or more base stations 130 and may send the aggregated traffic to an external network via PGW 160. SGW 140 may also act as a mobility anchor during inter-base station handovers. In some implementations, SGW 140 may represent a group of discrete SGW devices that have been logically grouped or pooled together in order to, for example, provide SGW functionality with greater processing and load capacity than might otherwise be available with just a single SGW device. As described herein, a group of SGWs 140 may participate in a smooth load balancing procedure where the service and management of one or more UEs 110 and 112 is transferred from a source SGW 140 to a target SGW 140 without requiring a service break.

MME 150 may include one or more computation and communication devices that act as a control-node for eNB 130 and/or other devices that provide the air interface for wireless network 120. For example, MME 150 may perform operations to register UEs 110 and 112 with wireless network 120, to establish bearer channels (e.g., traffic flows) associated with a session with UEs 110 and 112, to hand off UEs 110 and 112 to another network, and/or to perform other operations. MME 150 may perform policing operations on traffic destined for and/or received from UEs 110 and 112. MME 150 may represent a group of discrete MME devices that have been logically grouped or pooled together in order to, for example, provide MME functionality with greater processing and load capacity than might otherwise be available with just a single MME device. As described herein, a group of MMEs 150 may participate in a smooth load balancing procedure where the service and management of one or more UEs 110 and 112 is transferred from a source MME 140 to a target MME 140 without requiring a service break.

PGW 160 may include one or more network devices that may aggregate traffic received from one or more SGWs 140, and may send the aggregated traffic to an external network. PGW 160 may also, or alternatively, receive traffic from the external network and may send the traffic toward UEs 110 and 112 via SGW 140, and/or eNB 130. In some implementations, PGW 160 may represent a group of discrete PGW devices that have been logically grouped together in order to, for example, provide PGW functionality with greater processing and load capacity than might otherwise be available with just a single PGW device. As described herein, a group of PGWs 160 may participate in a smooth load balancing procedure where the service and management of one or more UEs 110 and 112 is transferred from a source PGW 140 to a target PGW 140 without requiring a service break.

HSS 170 may include one or more devices that may manage, update, and/or store, in a memory associated with HSS 170, profile information associated with a subscriber. The profile information may identify applications and/or services that are permitted for and/or accessible by the subscriber; a Mobile Directory Number (MDN) associated with the subscriber; bandwidth or data rate thresholds associated with the applications and/or services; and/or other information. The subscriber may be associated with UEs 110 and 112. Additionally, or alternatively, HSS 170 may perform authentication, authorization, and/or accounting operations associated with the subscriber and/or a communication session with UEs 110 and 112.

A number of communication interfaces, which may include standardized 3GPP interfaces, are illustrated in FIG. 1. For example, an MME 150 may communicate with another MME 150 using an S10 interface, which may be used as a control plane interface. Additionally, the S1 interface may be used for user plane and control plane communications between MME 150 and eNB 130, and/or for communications between SGW 140 and eNB 130. The S11 interface may be used for control plane communications between SGW 140 and MME 150, and the S5 interface may be used for control plane communications between SGW 140 and PGW 160. One or more additional, or alternative, interfaces may also be implemented. Additionally, one or more protocols may be used in communicating between the devices of wireless network 120. Examples of such protocols may include a General Packet Radio Service (GPRS) Tunnel Protocol (GTP) and Application Protocol for the S1 interface (S1AP), etc.

In some implementations, environment 100 may include one or more additional and/or alternative devices. For instance, one or more of the devices discussed above may correspond to an LTE network; however, environment 100 may include devices that correspond to other types of wireless networks such as a Global System for Mobile Communications (GSM) network, a Universal Terrestrial Radio Access Network (UTRAN), etc. Specific examples of such devices may include a Radio Network Controller (RNC), a Base Station Controller (BSC), a Serving GPRS Support Node (SGSN), a Policy and Charging Rules Function (PCRF) device, etc.

An RNC may be responsible for controlling one or more NodeBs in a wireless network. The RNC may carry out radio resource management, certain mobility management functions, and may be the point where encryption is conducted before user data is sent to and from UEs. A BSC may function to control the configuration and operation of base stations, including allocation of radio channels, managing UE handover procedures, etc. An SGSN may be responsible for the delivery of data packets to and from UEs within a particular service area. For instance, the SGSN may route and transfer information (e.g., packets) within the network, be in charge of attachment, detachment, and location management issues, and may perform authentication and charging functions. A PCRF device may be capable of determine policy rules for multimedia communications. The PCRF may have access to subscriber databases and specialized functions in order to enable a wireless network to implement subscriber-driven policies in real-time. Examples of these devices with respect to smooth UE transfers within a wireless network are discussed below with reference to FIG. 7 and FIG. 8.

Figure 2:
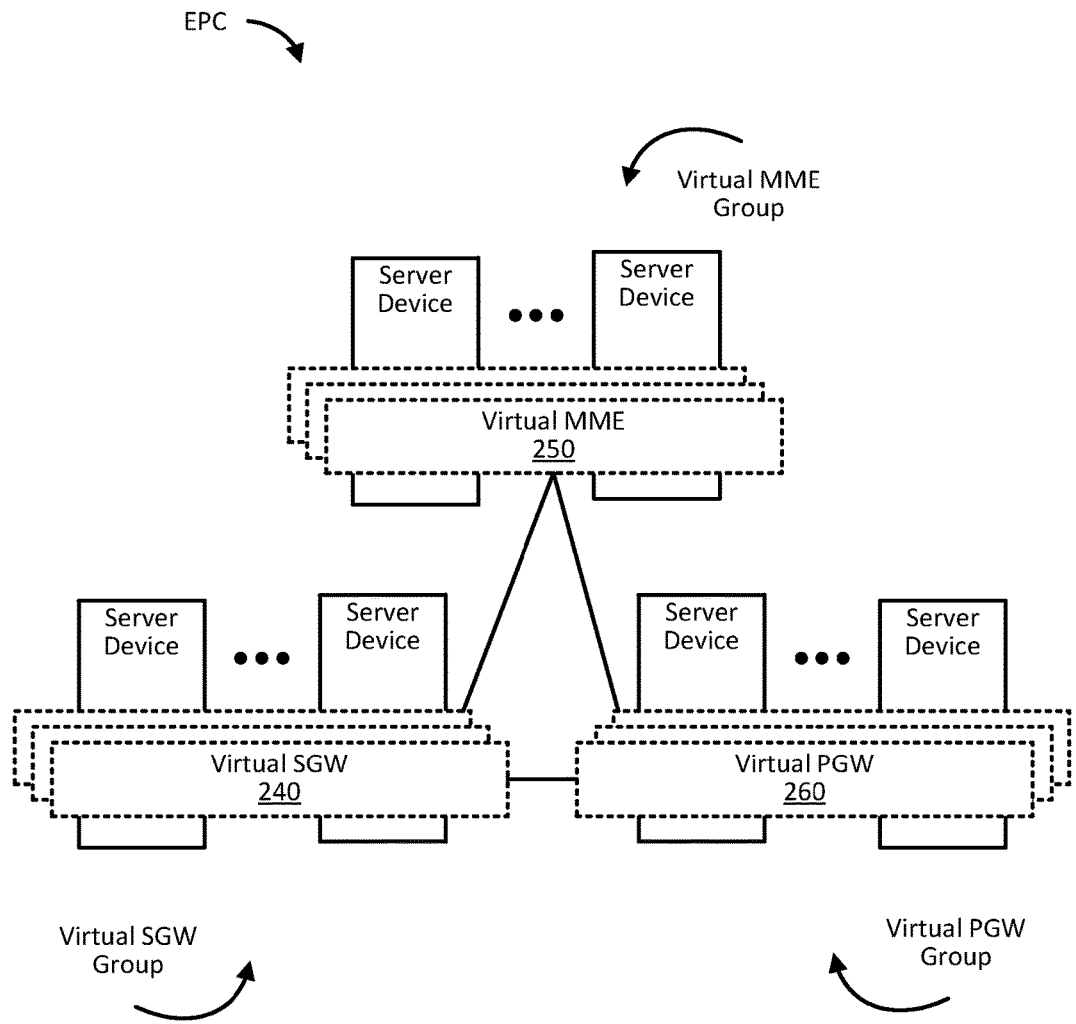
FIG. 2 is a diagram of an example implementation of virtualized portions of the environment shown in FIG. 1.

FIG. 2 is a diagram of an example implementation of virtualized portions of environment 100 shown in FIG. 1. As illustrated in FIG. 2, an EPC may include one or more virtualized EPC devices, such as a virtual SGW 240, a virtual MME 250, and/or a virtual PGW 260. Each virtualized EPC device may include a Network Virtualized Function (NVF), such as an MME function, a SGW function, or a PGW function, that is implemented across one or more server devices.

The storage and processing resources used to carry out a particular NVF function may be increased and decreased. For instance, just as a physical MME device may be added to an existing group of MME devices in order to increase the ability of a network to provide MME functions, the resources from server devices dedicated to an MME function may be increased in order to increase the ability of the network to provide MME services. An SGW function and a PGW function may be implemented in a similar way. However, in an NVF, resources may be added or removed with much greater granularity since a portion of processing power amongst multiple server devices may be scaled up or down dynamically, instead of having to add or remove an entire physical device in order to change the processing power, as is often the case in traditional EPC device group implementations.

Figure 3:
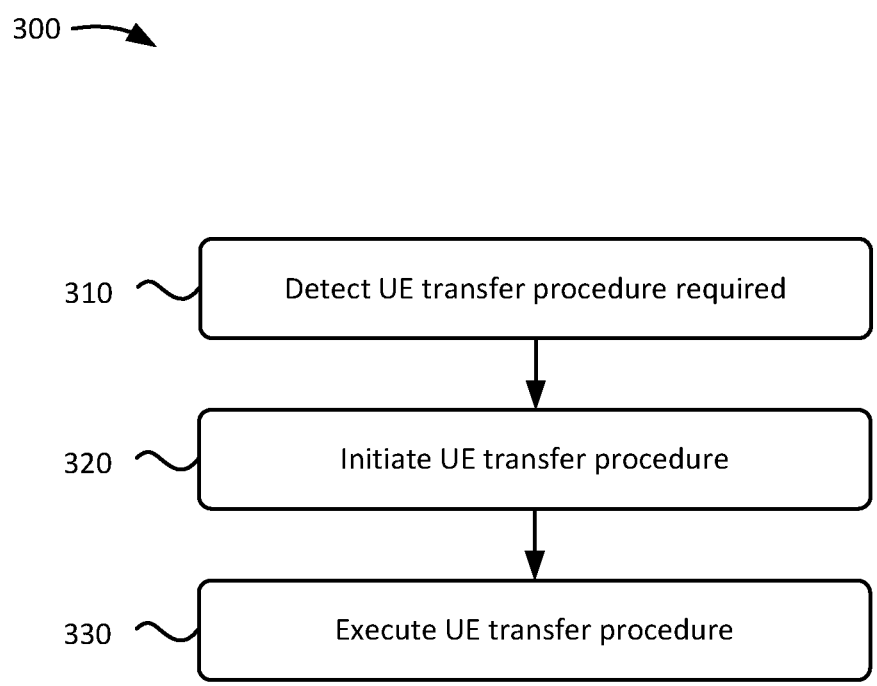
FIG. 3 is flow chart illustrating an example process for transferring a connection with a User Equipment (UE) from one Evolved Packet Core (EPC) device to another EPC device.

FIG. 3 is flow chart illustrating an example process 300 for transferring a connection with UE 110 from one EPC device to another EPC device. Process 300 may be implemented, for example, by one or more EPC devices (e.g., SGW 140, MME 150, or PGW 160) and/or virtual EPC devices (e.g., virtual SGW 240, virtual MME 250, or virtual PGW 260).

Process 300 may include detecting that a UE transfer procedure is required (block 310). For example, an EPC device may determine that a connection with UE 110 should be transferred to another EPC device because of a change in the EPC device itself, such as a quantity of UEs 110 being supported by the EPC device exceeding a pre-selected threshold, an over usage of processing or other performance-related resources of the EPC device, etc. In certain implementations, the EPC device may determine that the connection with UE 110 should be transferred to another EPC device because of a change in a group of EPC devices to which the EPC device pertains, such as an EPC device being added to or removed from a group of EPC devices (e.g., for maintenance purposes, to increase or decrease the processing capacity of the group of EPC devices, etc.). Additionally, or alternatively, EPC device may determine that the connection with UE 110 should be transferred to another EPC device based on UE behavior, such as UE 110 using an amount of bandwidth that exceeds a pre-selected threshold, UE 110 moving to a geographical location that makes another EPC device more suitable for servicing UE 110, etc. Furthermore, the need to perform a UE transfer procedure may arise while UE 110 is in one or more states of operation, such as during an attachment procedure with wireless network 120, during a standard operating mode with respect to wireless network 120, or after UE 110 has entered an idle mode.

Process 300 may include initiating a UE transfer procedure (block 320). For instance, an EPC device may initiate a UE transfer procedure by communicating a request to relocate the management of UE 110 to one or more other EPC devices within an EPC. In some implementations, a source MME 150 may communicate a request to relocate a particular UE 110 to a target MME 150, and the target MME 150 may forward the request to an eNB 130 charged with communicating with the UE 110. However, in other implementations, the source MME 150 may communicate the relocation request directly to eNB 130.

In yet other implementations, SGW 140 or PGW 160 may communicate the relocation request to MME 150, and MME 150 may forward the request to eNB 130. As described below in detail, the relocation request may include information for identifying the connections with UE 110 to be transferred and information for identifying the EPC device to which the connection is being transferred. For instance, in scenarios where a target MME 150 sends a relocation request to a eNB 130, the relocation request may include an identifier of the target MME 150 within the MME group and an identifier of the UE 110 within the target MME 140 such that eNB 130 will forward subsequent messages to the target MME 140 instead of the source MME 140.

Process 300 may include executing the UE transfer procedure (block 330). For example, an EPC may operate to transfer the responsibility to service a particular UE 110 from one EPC device to another EPC device. In some implementations, UE 110 may be transferred from a source MME 150 to a target MME 150. In other implementations, UE 110 may be transferred from a source SGW 140 to a target SGW 140. In yet other implementations, UE 110 may be transferred from a source PGW 160 to a target PGW 160. As described in greater detail below with reference to FIGS. 4-10, transferring the responsibility to service a particular UE 110 from one EPC device to another EPC device may include unique EPC operations and information that triggers one or more existing EPC procedures, thereby providing UE transfer techniques that can be readily integrated within existing wireless network systems.

Figure 4:
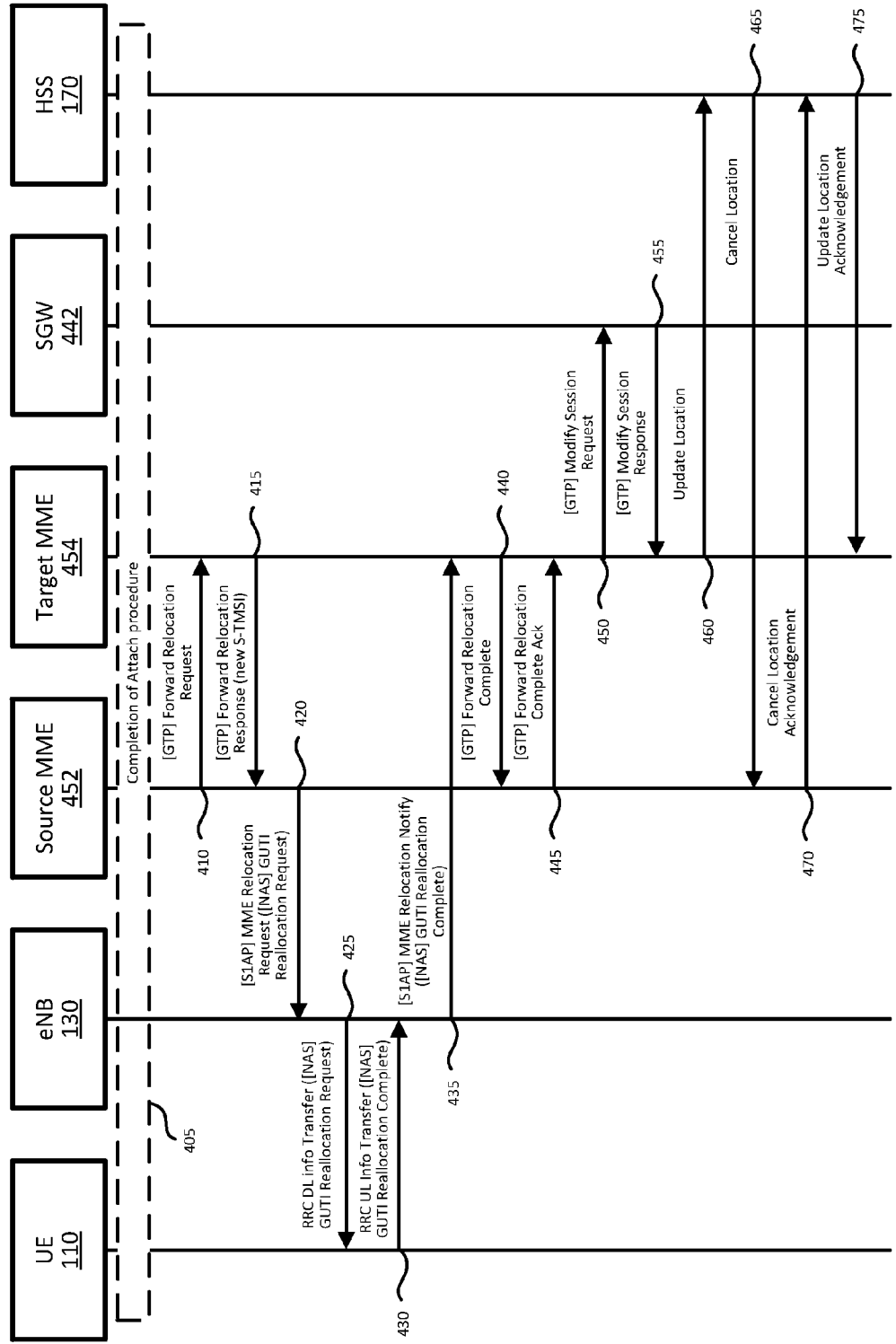
FIG. 4 is a signal flow diagram illustrating a process for transferring a connection with a UE from a source Mobility Management Entity (MME) to a target MME.

FIG. 4 is a signal flow diagram illustrating a process for transferring a connection with UE 110 from a source MME 452 to a target MME 454. Source MME 452 and target MME 454 may be examples of MME 150 of FIG. 1 or virtual MME 250 of FIG. 2. Similarly, SGW 442 may be an example of SGW 140 of FIG. 1 or virtual SGW 240 of FIG. 2. Additionally, source MME 452 and target MME 454 may belong to the same group of MMEs within wireless network 120.

As shown in FIG. 4, an attachment procedure (block 405) may be performed in order to connect UE 110 to a wireless network (e.g., wireless network 120). During, or as a result of the attachment procedure, source MME 452 may determine that target MME 454 is more appropriate for providing services to UE 110. As such, source MME 452 may communicate a request to target MME 454 to transfer a connection with UE 110 from source MME 452 to target MME 454 (line 410). The request may include a FORWARD RELOCATION REQUEST message that is communicated via a signaling protocol, such as General Packet Radio Service (GPRS) Tunnel Protocol (GTP) Control plane protocol (GTP-C). The request may also include connection context information, such as security keys, for the connection being transferred.

Target MME 454 may decide to accept the relocation request and create a new Temporary Mobile Subscriber Identity (TMSI) for UE 110. The new TMSI may uniquely identify UE 110 from among other UEs managed by target MME 454. The TMSI may be referred to as an MME-TMSI, or simply as an M-TMSI, since the TMSI was assigned by an MME device. Target MME 454 may use the M-TMSI to create a System Architecture Evolved (SAE) TMSI (referred to as an S-TMSI) that is a combination of several different types of information, including the M-TMSI and an MME Code (MMEC). The MMEC may uniquely identify target MME 454 within an MME group to which source MME 452 and target MME 454 belong. Target MME 454 may communicate the S-TMSI to source MME 452 (line 415) in a response message (e.g., a FORWARD RELOCATION RESPONSE message) using the same protocol used by source MME 452 to send the request (e.g., GTP-C). Thus, target MME 454 may respond to the relocation request from source MME 452 with an S-TMSI that uniquely identifies UE 110 within target MME 454 and target MME 454 within the MME group.

In response, source MME 452 may trigger a Non-Access Stratum (NAS) Globally Unique Temporary Identity (GUTI) Reallocation procedure toward UE 110 by generating a reallocation request message (e.g., a [NAS] GUTI REALLOCATION REQUEST message) (line 420). The reallocation request message may include a Mobile Country Code (MCC), a Mobile Network Code (MNC), an MME group identifier (MMEGI), and the S-TMSI from target MME 454. In general, GUTI Reallocation procedures can be used to declare an identifier for a UE and a corresponding MME for network signaling purposes.

Source MME 452 may initiate the sending of the reallocation request message towards UE 110 using a new relocation request message (e.g., an MME RELOCATION REQUEST message) that is communicated to eNB 130 using S1 Application Protocol (S1AP) (line 420). Since the MME RELOCATION REQUEST message may convey the S-TMSI created by target MME-454, the relocation request message may indicate to eNB 130 that any subsequent NAS messages (e.g., a [NAS] GUTI REALLOCATION COMPETE message) from UE 110 should be directed towards target MME 454 and not source MME 452.

eNB 130 may receive the reallocation request message (e.g., the [NAS] GUTI REALLOCATION REQUEST message) from source MME 452 and forward the message to UE 110 (line 425). eNB 130 may communicate the reallocation request message using a Radio Resource Control (RRC) Downlink (DL) Information Transfer procedure. UE 110 may take note of the newly assigned GUTI and may respond with a reallocation complete message (e.g., with a [NAS] GUTI REALLOCATION COMPLETE message) via an RRC Uplink (UL) Information Transfer procedure (line 430). eNB 130 may receive the reallocation complete message from UE 110 and may forward the reallocation complete message to target MME 454 using a new reallocation notify message (e.g., an MME RELOCATION NOTIFY message) using S1AP (line 435). In response, target MME 454 may inform source MME 452 that the relocation procedure has been completed by communicating a FORWARD RELOCATION COMPLETE message to source MME 452 using GTP-C (line 440). In turn, source MME 452 may reply with an acknowledgement message (e.g., a RELOCATION COMPLETE ACKNOWLEDGEMENT) message using GTP-C (line 445).

Target MME 454 may create associations with SGW 440 by communicating a modify session message (e.g., MODIFY SESSION REQUEST message) to SGW 442 using GTP (line 450), and in response, receive a response message confirming the session modification (e.g., a MODIFY SESSION RESPONSE message) via GTP-C (line 455). Target MME 454 may also notify HSS 170 that target MME 454 will now be serving as the new contact point for UE 110 by communicating and an update message (e.g., an UPDATE LOCATION message) to HSS 170 (line 460). HSS 170 may respond by sending a cancel command message (e.g., a CANCEL LOCATION message) to source MME 452 (line 465) which may cause source MME 452 to delete context information for UE 110 and communicate an acknowledgement message (e.g., a CANCEL LOCATION ACKNOWLEDGEMENT message) to HSS 170 (line 470). HSS 170 may communicate an acknowledgement message (e.g., an UPDATE LOCATION ACKNOWLEDGEMENT message) to target MME 454 to confirm that the HSS services for UE 110 have been updated (line 475).

Figure 5:
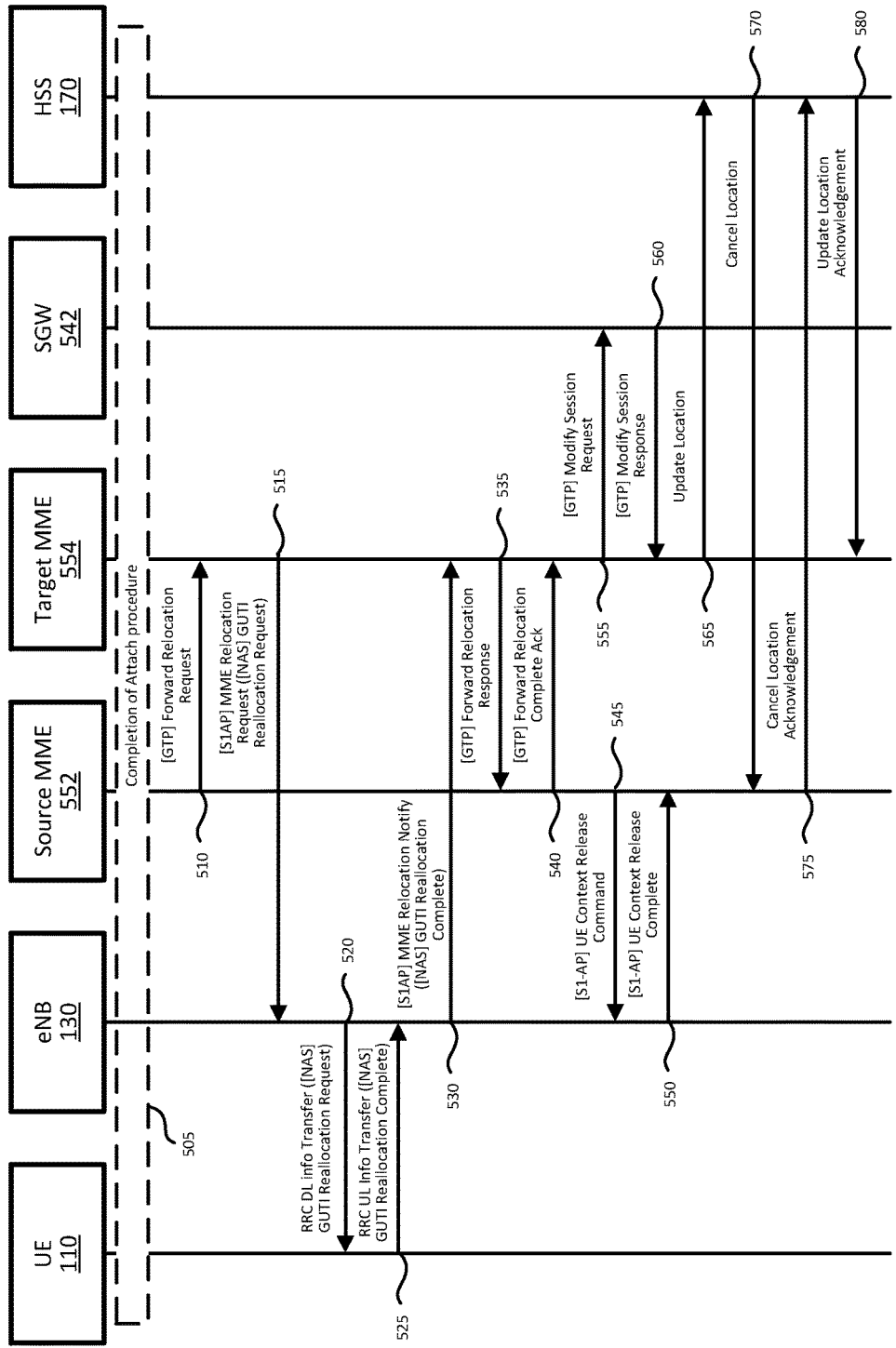
FIG. 5 is a signal flow diagram illustrating another process for transferring a connection with a UE from a source MME to a target MME.

FIG. 5 is a signal flow diagram illustrating a process for transferring a connection with UE 110 from a source MME 552 to a target MME 420. Source MME 552 and target MME 454 may be examples of MME 150 of FIG. 1 or virtual MME 250 of FIG. 2. Similarly, SGW 542 may be an example of SGW 140 of FIG. 1 or virtual SGW 240 of FIG. 2. Source MME 552 and target MME 554 may belong to the same group MMEs within wireless network 120.

As shown in FIG. 5, an attachment procedure (block 505) may be performed in order to connect UE 110 to a wireless network (e.g., wireless network 120). During, or as a result of, the attachment procedure, source MME 552 may determine that target MME 554 is more appropriate for providing services to UE 110. As such, source MME 552 may communicate a request to target MME 554 to transfer a connection with UE 110 from source MME 552 to target MME 552 (line 510). The request may include a FORWARD RELOCATION REQUEST message that is communicated via a signaling protocol, such as GTP-C.

Target MME 554 may decide to accept the relocation request and create a new TMSI for UE 110. The new TMSI may uniquely identify UE 110 from among other UEs managed by target MME 554, and may be referred to an M-TMSI since the TMSI was assigned by an MME device. Target MME 554 may use the M-TMSI to create an S-TMSI that is a combination of several different types of information, including the M-TMSI and an MMEC. The MMEC may uniquely identify target MME 554 within an MME group to which source MME 552 and target MME 554 belong. Additionally, target MME 554 may initiate a reallocation procedure (e.g., a [NAS] GUTI Reallocation procedure) towards UE 110 by generating a reallocation request message (e.g., a [NAS] GUTI REALLOCATION REQUEST message) and communicating the reallocation request message to eNB 130 using a new MME Relocation Request message via a protocol such as S1AP (e.g., a [S1AP] MME RELOCATION REQUEST message) (line 515).

eNB 130 may receive the relocation request message may forward the reallocation request message to UE 110 using an information transfer procedure such as RRC DL Information Transfer (line 520). UE 110 may note the newly assigned GUTI and may respond to eNB 130 with a reallocation complete message, such as a [NAS] GUTI REALLOCATION COMPLETE message, via a procedure such as RRC UL Information Transfer (line 525). eNB 130 may forward the reallocation complete message to target MME 554 using an MME relocation notification message (e.g., [S1AP] MME RELOCATION NOTIFY message) using a protocol such as S1AP (line 530). In response, target MME 554 may send a relocation response message (e.g., a [GTP] FORWARD RELOCATION RESPONSE message) to source MME 552 using GTP-C (line 535) and source MME 552 may reply with a relocation complete message (e.g., a [GTP] RELOCATION COMPLETE ACKNOWLEDGEMENT) message using a tunneling protocol such as GTP-C (line 540).

Source MME 552 may communicate a UE context release message (e.g., a [S1AP] UE CONTEXT RELEASE COMMAND message) to eNB 130 using a protocol such as S1AP (line 545) and eNB 130 may respond by sending a context release complete message (e.g., a [S1AP] UE CONTEXT RELEASE COMPLETE message) to source MME 552 using a protocol such as S1AP (line 550). The context release and context release complete message may confirm that context information (such as security keys) for UE 110 has been transferred to target MME 554.

Target MME 554 may create associations with SGW 542 by communicating a modify session request message (e.g., a [GTP] MODIFY SESSION REQUEST message) to SGW 542 using a signaling protocol such as GTP-C (line 555), and in response, SGW 542 may respond by confirming that the session has been modified using, for example, a [GTP] MODIFY SESSION RESPONSE message via GTP-C (line 560). Target MME 554 may also notify HSS 170 that target MME 554 will now be serving as the new contact point for UE 110 by communicating an UPDATE LOCATION message to HSS 170 (line 565). In response, HSS 170 may respond to the notification by sending a CANCEL LOCATION message to source MME 552 (line 570) which may cause source MME 552 to delete context information for UE 110 and communicate a CANCEL LOCATION ACKNOWLEDGEMENT message to HSS 170 (line 575) in return. HSS 170 may communicate an UPDATE LOCATION ACKNOWLEDGEMENT message to target MME 455 to confirm that HSS services for UE 110 have been updated (line 580).

Figure 6:
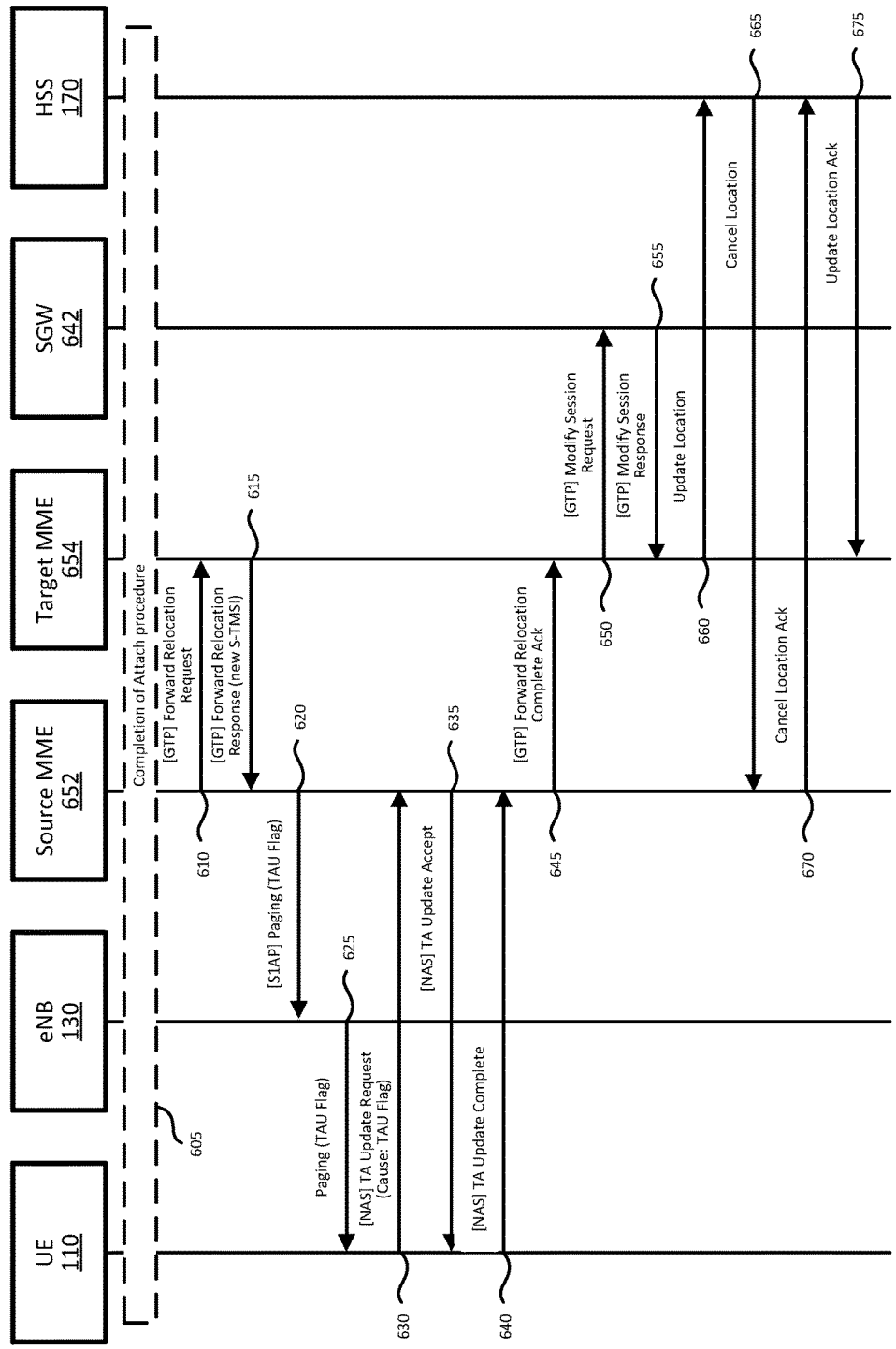
FIG. 6 is a signal flow diagram illustrating a process for transferring a connection with a UE from a source MME to a target MME while the UE is in an idle mode.

FIG. 6 is a signal flow diagram illustrating a process for transferring a connection with UE 110 from a source MME 652 to a target MME 654 while UE 110 is in an idle mode. Source MME 652 and target MME 654 may be examples of MME 150 of FIG. 1 or virtual MME 250 of FIG. 2. Similarly, SGW 642 may be an example of SGW 140 of FIG. 1 or virtual SGW 240 of FIG. 2. Source MME 652 and target MME 654 may belong to the same logical group of MMEs within wireless network 120.

As shown in FIG. 6, an attachment procedure (block 605) may be performed in order to connect UE 110 to a wireless network (e.g., wireless network 120). During, or as a result of, the attachment procedure, source MME 652 may determine that target MME 654 is more appropriate for providing services to UE 110. As such, source MME 652 may communicate a request to target MME 654 to transfer the management of UE 110 from source MME 652 to target MME 654 (line 610). The request may include a FORWARD RELOCATION REQUEST message that is communicated via a signaling protocol, such as GTP-C.

Target MME 654 may decide to accept the relocation request and create a new TMSI for UE 110. The TMSI may be referred to as an M-TMSI since the TMSI was assigned by an MME device. Target MME 554 may use the M-TMSI to create an S-TMSI that is a combination of several different types of information, including the M-TMSI and an MMEC. Target MME 654 may communicate (line 615) the S-TMSI to source MME 652 in a response message (e.g., a FORWARD RELOCATION REQUEST message) using the same protocol as used by source MME 652 to send the relocation request (e.g., GTP-C). Thus, target MME 654 may respond to the relocation request from source MME 652 with an S-TMSI that uniquely identifies UE 110 within target MME 654 and target MME 654 within the MME group.

In response, source MME 652 may trigger a paging procedure by sending a paging message (e.g., a PAGING message) to eNB 130 using S1AP (line 620). The paging message may include a new flag (e.g., a Tracking Area Update (TAU) Flag) indicating that UE 110 should respond with a TAU procedure instead of, for example, a Service Request procedure. The paging message may cause eNB 130 to page UE 110 (line 625) via a radio interface using the new TAU Flag in a paging record, as defined in 3GPP TS 36.331.

UE 110 may request that an RRC connection be established (not shown) and may send a tracking request (e.g., a TRACKING AREA UPDATE REQUEST) using the NAS Protocol to source MME 642 (line 630). The tracking request may indicate that the request was triggered by the TAU Flag in the paging message from eNB 130. Source MME 642 may respond with a message confirming that the tracking message has been accepted (e.g., a TRACKING AREA UPDATE ACCEPT message) which may be sent using NAS Protocol (line 635). The message confirmation may include the newly assigned S-TMSI as part of a new GUTI.

UE 110 may note the newly assigned GUTI and respond by sending tracking area update complete message to source MME 642 (e.g., a TRACKING AREA UPDATE COMPLETE message) using NAS Protocol (line 640). At this point, UE 110 may not be aware that future message sent using NAS Protocol will be received by a different MME (e.g., target MME 654). Upon receiving the tracking area update complete message, source MME 652 may communicate a relocation acknowledgement message (e.g., a [GTP] FORWARD RELOCATION COMPLETE ACK message) to target MME 654 using a signaling protocol, such as GTP-C (line 645) which may complete the context information for UE 110 being successfully transferred to target MME 654.

Target MME 654 may create associations with SGW 642 by communicating a modify session message (e.g., [GTP] MODIFY SESSION REQUEST message) to SGW 642 using GTP-C (line 650), and in response, receive a modify session response message (e.g., a [GTP] MODIFY SESSION RESPONSE message) via GTP-C (line 655). Target MME 654 may also notify HSS 170 that target MME 654 will now be serving as the new contact point for UE 110 by communicating and an update message (e.g., an UPDATE LOCATION message) to HSS 170 (line 660). HSS 170 may respond by sending a cancel message (e.g., a CANCEL LOCATION message) to source MME 652 (line 665) which may cause source MME 652 to delete context information for UE 110 and communicate an acknowledgement message (e.g., a CANCEL LOCATION ACKNOWLEDGEMENT message) to HSS 170 (line 670). HSS 170 may communicate an acknowledgement message (e.g., an UPDATE LOCATION ACKNOWLEDGEMENT message) to target MME 654 to confirm that the HSS services for UE 110 have been updated (line 675).

Figure 7:
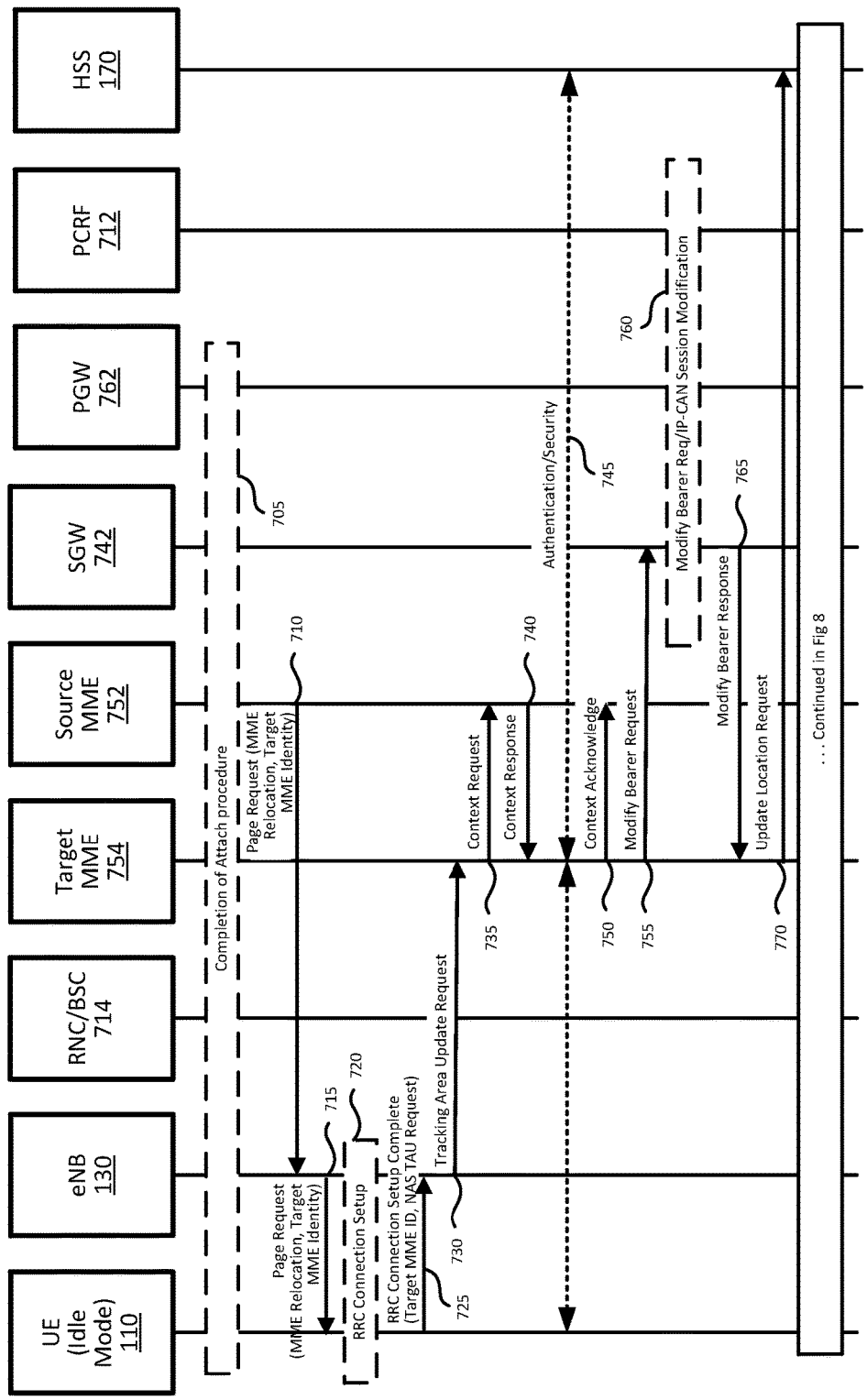
FIG. 7 is a signal flow diagram illustrating another process for transferring a connection with a UE from a source MME to a target MME while the UE is in an idle mode.
Figure 8:
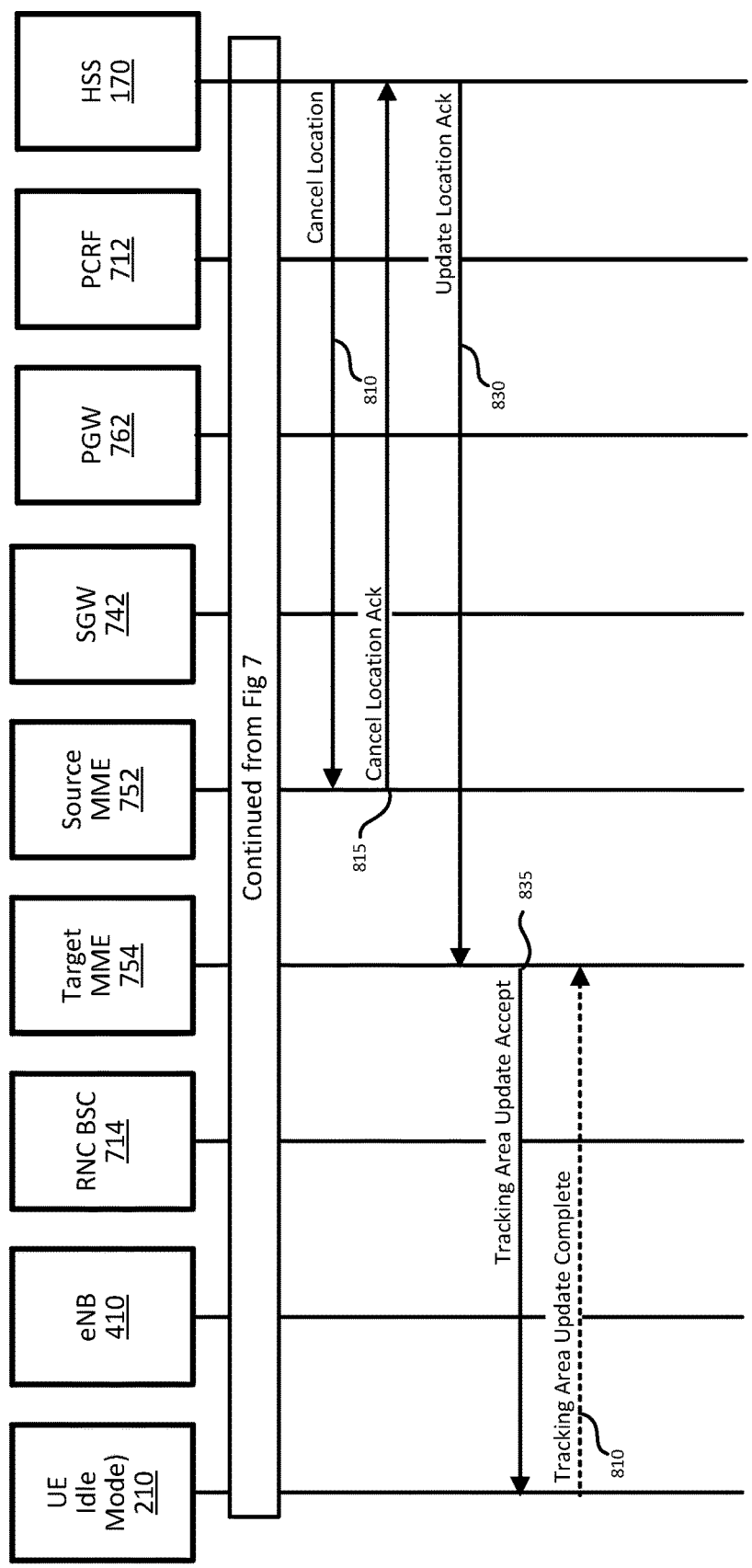
FIG. 8 is a signal flow diagram illustrating additional operations for the signal flow diagram illustrated in FIG. 7.

FIG. 7 and FIG. 8 are a signal flow diagram illustrating a process for transferring a connection with UE 110 from a source MME 752 to a target MME 754 while UE 110 is in an idle mode. Source MME 752 and target MME 754 may be examples of MME 150 of FIG. 1 or virtual MME 250 of FIG. 2. Similarly, SGW 742 and PGW 762 may be examples of SGW 140 and PGW 160 of FIG. 1 or virtual SGW 240 and PGW 260 of FIG. 2. Source MME 752 and target MME 754 may belong to the same logical group of MMEs within wireless network 120.

As shown in FIG. 7, an attachment procedure (block 705) may be performed in order to connect UE 110 to a wireless network (e.g., wireless network 120). At some point after UE 110 enters an idle mode, which may include a scenario where UE 110 only performs a limited array of functions such as maintaining service, listening for RRC connections and data transfers, and receiving incoming connections via paging procedures. During such a scenario, source MME 752 may determine that target MME 754 is more appropriate for providing services to UE 110. As such, source MME 752 may initiate a paging procedure toward UE 110 via eNB 130 (line 710) which may include communicating a PAGING REQUEST message that includes an identity of target MME 754 and an MME Relocation Request.

eNB 130 may use the identity of target MME 754 to identify and selected target MME 754 as the destination for the transfer of UE 110. In some implementations, the identity could be a previously designated index value or an MMEC for target MME 754. Additionally, or alternatively, the identity could be a GUTI, a GUMMEI, or an MME identifier (MMEI). eNB 130 may page UE 110 (line 715) in response to the paging message from source MME 752. The paging message from eNB 130 to UE 110 may include an MME Relocation Request along with the identity of target MME 754.

In response to the paging message from eNB 130, UE 110 may establish an RRC connection with eNB 130. As shown, this may include UE 110 sending an RRC CONNECTION REQUEST message to eNB 130 (line 720) and eNB 130 responding with an RRC CONNECTION SETUP COMPLETE message (line 725). The RRC CONNECTION REQUEST message may include the identity of target MME 754 and a NAS TAU Request. The remaining operations depicted in FIG. 7 and FIG. 8 will be briefly covered below as they correspond to a TAU procedure, as defined in 3GPP TS 23.401.

eNB 130 may request a tracking update by sending a TRACKING AREA UPDATE REQUEST message to target MME 754 (line 730). In response, context information for UE 110 may be updated by target MME 754 sending a CONTEXT REQUEST message to source MME 752 (line 735) and receiving a CONTEXT RESPONSE message in return (line 740). As shown, authentication and security procedures may then be performed throughout the network (line 745) followed by a CONTEXT ACK message from target MME 754 to source MME 752 (line 750). In order to coordinate with SGW 740, target MME 754 may communicate a MODIFY BEARER REQUEST message to SGW 740 (line 755) which may, as depicted, trigger a procedure involving a MODIFY BEARER REQUEST and Internet Protocol (IP) Connectivity Access Network (IP-CAN) Session Modification (block 760). Upon completion of the procedure, a MODIFY BEARER RESPONSE message may be sent from SGW 740 to target MME 754 (line 765).

Target MME 754 may send an UPDATE LOCATION REQUEST from target MME 754 to HSS 170 (line 770). Continuing on FIG. 8, HSS 170 may communicate a CANCEL LOCATION message source MME 752 (line 810), and source MME 752 may respond with a CANCEL LOCATION ACK message (line 815). HSS 170 may send an UPDATE LOCATION ACK message to target MME 754 (line 830), target MME 754 may send a TRACKING AREA UPDATE ACCEPT message to UE 110 (line 835), and UE 110 may send a TRACKING AREA UPDATE COMPLETE message back to target MME 754 to complete the overall TAU procedure (line 840).

Figure 9:
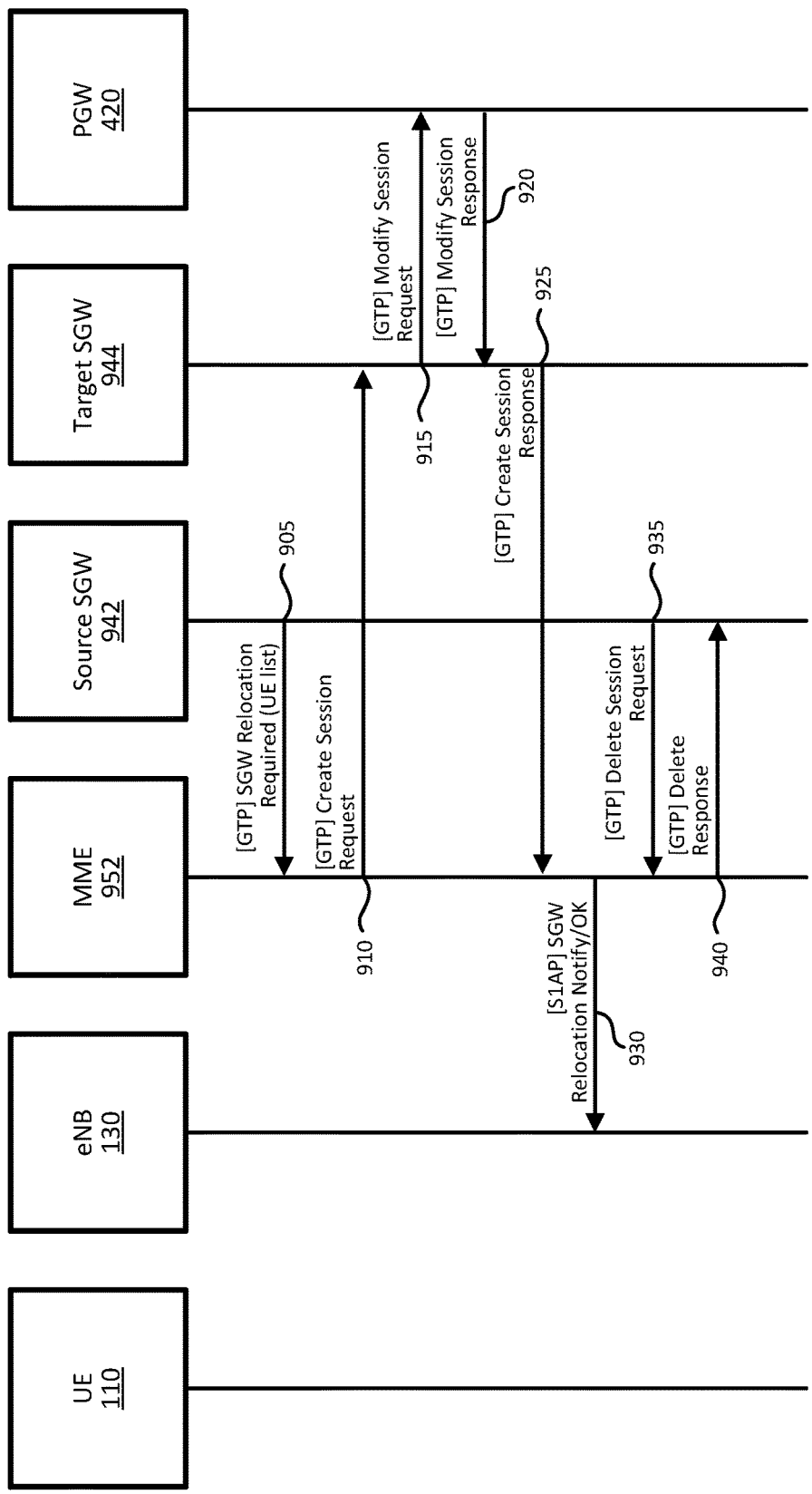
FIG. 9 is a signal flow diagram illustrating a process for transferring a connection with a UE from a source SGW to a target SGW.

FIG. 9 is a signal flow diagram illustrating a process for transferring a connection with UE 110 from a source SGW 942 to target SGW 944. Source SGW 942 and target SGW 944 may be examples of SGW 140 of FIG. 1 or virtual SGW 240 of FIG. 2. Similarly, MME 952 and PGW 962 may be examples of MME 150 and PGW 160 of FIG. 1 or virtual MME 250 and PGW 260 of FIG. 2. Similarly, source SGW 942 and target SGW 944 may belong to the same logical group of SGWs within wireless network 120.

Source SGW 942 may decide to offload UEs 110 for one or more reasons, such as source SGW 942 being overloaded with UEs. As such, source SGW 942 may send a relocation request (e.g., a [GTP] SGW Relocation Request) to MME 952 (line 905). The relocation request may include a list of UE identifiers that correspond to the UEs 110 to be transferred to target SGW 944. The remaining operations depicted in FIG. 9 will be briefly covered below as they correspond to an SGW Relocation Procedure, as defined in 3GPP TS 23.401, clause 5.10.4.

MME 952 may respond by sending a request to target SGW 944 to create new communication sessions for the UEs 110 (line 910). The request may include a [GTP] CREATE SESSION REQUEST. Target SGW 944 may communicate with PGW 962 to modify the communication sessions as necessary (line 915) which may include a [GTP] MODIFY SESSION REQUEST message from target SGW 942 to PGW 944. In response, PGW 962 may send a [GTP] MODIFY SESSION RESPONSE message to target SGW 942 (line 920).

Target SGW 942 may communicate a response to the request to create a session from MME 952, which may be in the form of a [GTP] CREATE SESSION RESPONSE message (line 925). MME 952 may notify eNB 130 of the relocation procedure, which may include an [S1AP] SGW RELOCATION NOTIFY message from MME 952 to eNB 130, and an [S1AP] SGW RELOCATION OK message from eNB 130 (line 930). Source SGW 942 may communicate a request to MME 952 to delete the sessions for the transferred UEs (e.g., a [GTP] DELETE SESSION REQUEST message), and MME 952 may respond with a confirmation message such as a [GTP] DELETE SESSION RESPONSE message. As such, one or more UEs 110 may be transferred from one SGW (e.g., source SGW 942) to another SGW (e.g., target SGW 944).

Figure 10:
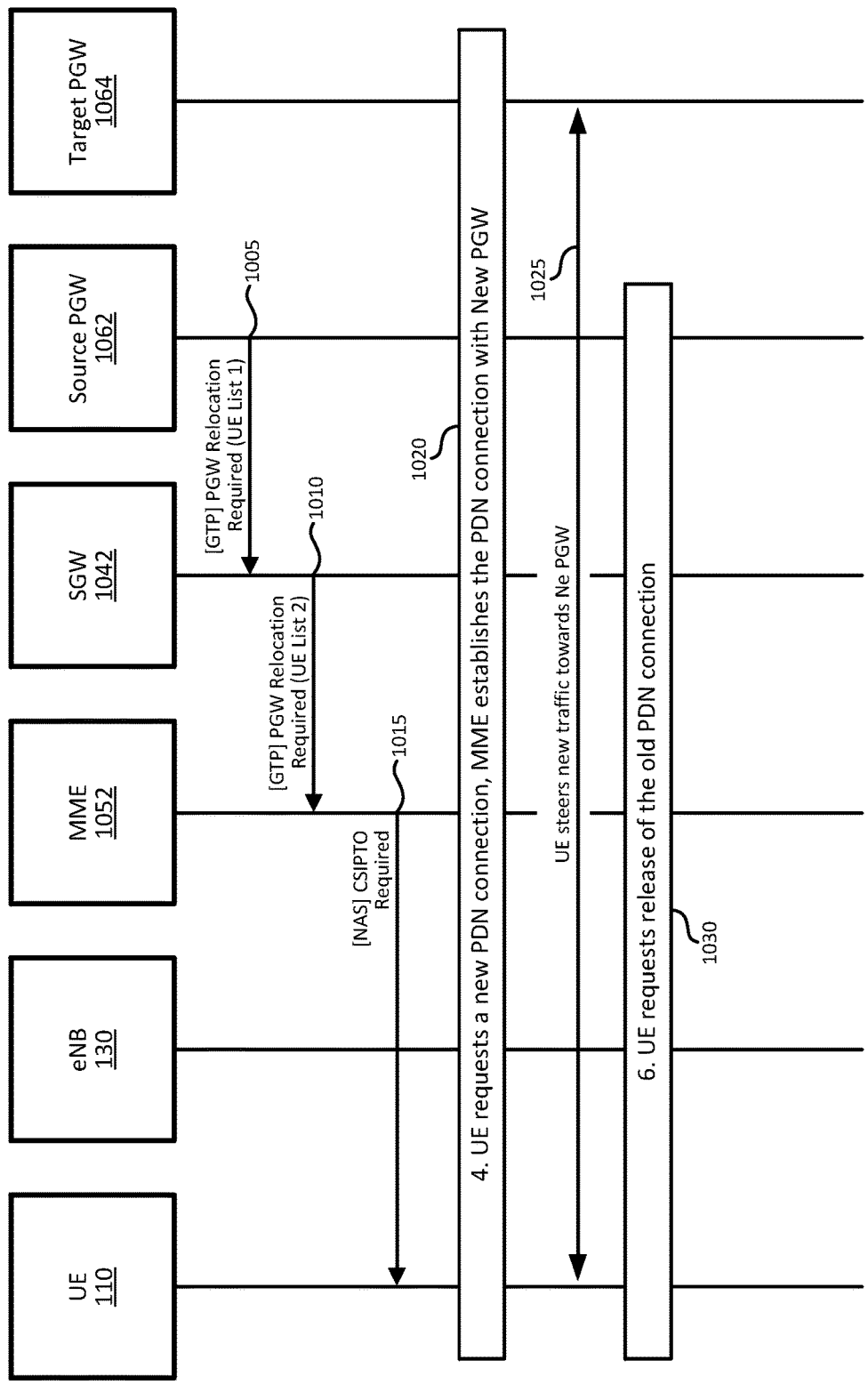
FIG. 10 is a signal flow diagram illustrating a process for transferring a connection with a UE from a source PGW to a target PGW.

FIG. 10 is a signal flow diagram illustrating a process for transferring a connection with UE 110 from source PGW 1062 to target PGW 1064. Source PGW 1062 and target PGW 1064 may be examples of PGW 160 of FIG. 1 or virtual PGW 260 of FIG. 2. Similarly, MME 1052 and SGW 1042 may be examples of MME 150 and SGW 140 of FIG. 1 or virtual MME 250 and PGW 260 of FIG. 2. Source PGW 1062 and target PGW 1064 may belong to the same logical group of PGWs within wireless network 120.

Source PGW 1062 may decide to offload UEs 110 for one or more reasons, such as source PGW 1062 being overloaded with UEs. As such, source PGW 1062 may communicate a request to SGW 1042 about relocating one or UEs (line 1005). The request may include a [GTP] PGW RELOCATION REQUIRED message with a first list of UE identifiers corresponding to UEs 110 that are to be transferred. The first list of UE identifiers may be created by source PGW 1062 based on one or more criterion such as UEs 110 that are using significant amounts of bandwidth (e.g., bandwidth above a selected threshold, an upper percentage of UEs 110 with respect to bandwidth usage, etc.) The request from source PGW 1062 may cause SGW 1042 to create a second list of identifiers based on which identifiers from the first list of identifiers correspond to UEs 110 associated with MME 1052 (as opposed to another MME) and communicate the second list of identifiers in a relocation request to MME 1052 (line 1010). The relocation request from SGW 1042 may include a [GTP] PGW RELOCATION REQUIRED message.

Upon receipt of the PGW RELOCATION REQUIRED message, MME 1052 may execute a Coordinated Select IP Traffic Offload (Coordinated SIPTO, or CSIPTO) procedure for some or all of the UE identifiers in the list. For instance, as shown in FIG. 10, MME 1050 may communicate a [NAS] CSIPTO REQUEST message to UE 110 (line 1015) that may cause UE 110 to request a new Packet Data Network (PDN) connection and MME 1050 to establish a PDN connection with target PGW 1054 (block 1020). UE 110 may use the new PDN connection to route network traffic towards target PGW 1064 (line 1025) and cause the old PDN connection to be terminated (block 1030).

FIG. 11 is a diagram of example components of a device 1100. Each of the devices illustrated in FIGS. 1, 2, and 4-6 may include one or more devices 1100. Device 1100 may include bus 1110, processor 1120, memory 1130, input component 1140, output component 1150, and communication interface 1160. In another implementation, device 1100 may include additional, fewer, different, or differently arranged components.

Bus 1110 may include one or more communication paths that permit communication among the components of device 1100. Processor 1120 may include a processor, microprocessor, or processing logic that may interpret and execute instructions. Memory 1130 may include any type of dynamic storage device that may store information and instructions for execution by processor 1120, and/or any type of non-volatile storage device that may store information for use by processor 1120.

Input component 1140 may include a mechanism that permits an operator to input information to device 1100, such as a keyboard, a keypad, a button, a switch, etc. Output component 1150 may include a mechanism that outputs information to the operator, such as a display, a speaker, one or more light emitting diodes (LEDs), etc.

Communication interface 1160 may include any transceiver-like mechanism that enables device 1100 to communicate with other devices and/or systems. For example, communication interface 1160 may include an Ethernet interface, an optical interface, a coaxial interface, or the like. Communication interface 1160 may include a wireless communication device, such as an infrared (IR) receiver, a cellular radio, a Bluetooth radio, or the like. The wireless communication device may be coupled to an external device, such as a remote control, a wireless keyboard, a mobile telephone, etc. In some embodiments, device 1100 may include more than one communication interface 1160. For instance, device 1100 may include an optical interface and an Ethernet interface.

Device 1100 may perform certain operations described above. Device 1100 may perform these operations in response to processor 1120 executing software instructions stored in a computer-readable medium, such as memory 1130. A computer-readable medium may be defined as a non-transitory memory device. A memory device may include space within a single physical memory device or spread across multiple physical memory devices. The software instructions may be read into memory 1130 from another computer-readable medium or from another device. The software instructions stored in memory 1130 may cause processor 1120 to perform processes described herein. Alternatively, hardwired circuitry may be used in place of or in combination with software instructions to implement processes described herein. Thus, implementations described herein are not limited to any specific combination of hardware circuitry and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with regard to FIG. 3, the order of the blocks may be modified in other implementations. Further, non-dependent blocks may be performed in parallel. Similarly, while a series of communications have been described with regard to FIGS. 4-10, the order or nature of the communications may potentially be modified in other implementations.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as "logic" that performs one or more functions. This logic may include hardware, such as an application-specific integrated circuit (ASIC) or a field-programmable gate array (FPGA), or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Further, the phrase "based on" is intended to mean "based, at least in part, on" unless explicitly stated otherwise.

What is claimed is:

1. A Mobility Management Entity (MME) comprising:
a non-transitory computer-readable medium to store processor-executable instructions; and
processing circuitry to execute the processor executable instructions to:
establish a connection, via an Enhanced Node B (eNB), between a User Equipment (UE) and a wireless cellular network;
detect a need to transfer the connection to another MME within the wireless cellular network;
send, to the other MME, a request to transfer the connection and context information for establishing the connection;
receive, from the other MME and in response to the request, a temporary identifier for the UE and an identifier for the other MME; and
communicate, to the eNB, an indication to transfer the connection, associated with the UE, from the MME to the other MME, the indication including:
an S1-AP (S1 Application Protocol) message that includes the identifier for the other MME so that subsequent messages, from the UE to the eNB, are sent by the eNB to the other MME, and
encapsulated within the S1-AP message, a Globally Unique Temporary Identity (GUTI) REALLOCATION REQUEST message, which includes the temporary identifier and the identifier for the other MME, for the eNB to send to the UE, wherein the indication is to cause the eNB to communicate the GUTI REALLOCATION REQUEST message, to the UE, via a Radio Resource Control (RRC) Downlink (DL) INFORMATION TRANSFER message.

2. The MME of claim 1, wherein the temporary identifier and the identifier for the other MME are received by the MME as a System Architecture Evolved (SAE) Temporary Mobile Subscriber Identity (S-TMSI).

3. The MME of claim 1, wherein the GUTI REALLOCATION REQUEST message is a Non-Access Stratum (NAS) message configured to initiate a NAS GUTI Reallocation procedure.

4. The MME of claim 1, wherein the processing circuitry is further to:
determine that the UE is in an idle mode, and
communicate, to the eNB, the temporary identifier and the identifier for the other MME as part of an idle mode paging procedure directed toward the UE.

5. The MME of claim 1, wherein the MME and the other MME are part of a logical group of MMES within the wireless cellular network.

6. The MME of claim 1, wherein the need to transfer the management of the UE to the other MME is based on:
a change in a geographical location of the UE within the wireless cellular network,
a quantity of UEs currently managed by the MME,
a change in an availability of the MME within a group of MMES,
a change in a quantity of MMES within the group of MMEs, or
a change in a processing capacity allocated to the MME.

7. The MME of claim 1, wherein the MME and the other MME each include a virtual MME installed on one or more physical server devices.

8. The MME of claim 1, wherein the indication to transfer the connection from the MME to the other MME is to cause the eNB to notify the UE of the temporary identifier and to relay, based on the identifier of the other MME, communications from the UE to the other MME.

9. A Mobility Management Entity (MME) comprising:
a non-transitory computer-readable medium to store processor-executable instructions; and
processing circuitry to execute the processor executable instructions to:
receive, from another MME, a request to manage a connection between a User Equipment (UE) and a wireless network via an Enhanced Node B (eNB);
create, in response to the request from the other MME, a temporary identifier for the UE;
create, an S1-AP (S1 Application Protocol) message that includes the identifier for the MME so that subsequent messages, from the UE to the eNB, are sent by the eNB to the MME;
encapsulate, within the S1-AP message, a Globally Unique Temporary Identity (GUTI) REALLOCATION REQUEST message, which includes the temporary identifier and the identifier for the MME, for the eNB to send to the UE;
communicate, to the eNB connected to the UE, the S1-AP message to cause the eNB to communicate the GUTI REALLOCATION REQUEST message, to the UE, via a Radio Resource Control (RRC) Downlink (DL) INFORMATION TRANSFER message; and
receive, from the eNB and in response to communicating the S1-AP message, a message confirming that the UE has acknowledged the temporary identifier.

10. The MME of claim 9, wherein
the message confirming that the UE has acknowledged the temporary identifier includes a GUTI REALLOCATION COMPLETE message.

11. The MME of claim 9, wherein the MME and the other MME belong to a logical group of MMES within the wireless cellular network.

12. The MME of claim 9, wherein the connection is managed by the other MME before the request to transfer the connection is received.

13. The MME of claim 9, wherein the request to transfer the UE is received from the other MME is based on:
a change in a geographical location of the UE within the wireless cellular network,
a quantity of UEs currently managed by the other MME,
a change in an availability of the other MME within the group of MMES,
a change in a quantity of MME within a group of MMEs, or
a change in a processing capacity allocated to the other MME.

14. The MME of claim 9, wherein the temporary identifier assigned by the MME includes an MME Temporary Mobile Subscriber Identity (M-TMSI).

15. The MME of claim 9, wherein the MME and the other MME each include a virtual MMES installed on one or more physical server devices.

16. A non-transitory computer-readable medium storing a set of processor-executable instructions, which, when executed by one or more processors of a Mobility Management Entity (MME), cause the one or more processors to:
establish a connection, via an Enhanced Node B (eNB), between a User Equipment (UE) and a wireless cellular network;
detect a need to transfer the connection to another MME within the wireless cellular network;
send, to the other MME, a request to transfer the connection and context information for establishing the connection;
receive, from the other MME and in response to the request, a temporary identifier for the UE and an identifier for the other MME; and
communicate, to the eNB, an indication to transfer the connection, associated with the UE, from the MME to the other MME, the indication including:
an S1-AP (S1 Application Protocol) message that includes the identifier for the other MME so that subsequent messages, from the UE to the eNB, are sent by the eNB to the other MME, and
encapsulated within the S1-AP message, a Globally Unique Temporary Identity (GUTI) REALLOCATION REQUEST message, which includes the temporary identifier and the identifier for the other MME, for the eNB to send to the UE,
wherein the indication is to cause the eNB to communicate the GUTI REALLOCATION REQUEST message, to the UE, via a Radio Resource Control (RRC) Downlink (DL) INFORMATION TRANSFER message.

17. The non-transitory computer-readable medium of claim 16, wherein the temporary identifier and the identifier for the other MME are received by the MME as a System Architecture Evolved (SAE) Temporary Mobile Subscriber Identity (S-TMSI).

18. The non-transitory computer-readable medium of claim 16, wherein the GUTI REALLOCATION REQUEST message is a Non-Access Stratum (NAS) message configured to initiate a NAS GUTI Reallocation procedure.

19. The non-transitory computer-readable medium of claim 16, wherein the processor-executable instructions further include processor-executable instructions to:
determine that the UE is in an idle mode, and
communicate, to the eNB, the temporary identifier and the identifier for the other MME as part of an idle mode paging procedure directed toward the UE.

20. The non-transitory computer-readable medium of claim 16, wherein the MME and the other MME are part of a logical group of MMEs within the wireless cellular network.

21. The non-transitory computer-readable medium of claim 16, wherein the need to transfer the management of the UE to the other MME is based on:
a change in a geographical location of the UE within the wireless cellular network,
a quantity of UEs currently managed by the MME,
a change in an availability of the MME within a group of MMEs,
a change in a quantity of MMEs within the group of MMEs, or
a change in a processing capacity allocated to the MME.

22. The non-transitory computer-readable medium of claim 16, wherein the indication to transfer the connection from the MME to the other MME is to cause the eNB to notify the UE of the temporary identifier and to relay, based on the identifier of the other MME, communications from the UE to the other MME.

23. A non-transitory computer-readable medium storing a set of processor-executable instructions, which, when executed by one or more processors of a Mobility Management Entity (MME), cause the one or more processors to:
receive, from another MME, a request to manage a connection between a User Equipment (UE) and a wireless network via an Enhanced Node B (eNB);
create, in response to the request from the other MME, a temporary identifier for the UE;
create, an S1-AP (S1 Application Protocol) message that includes the identifier for the MME so that subsequent messages, from the UE to the eNB, are sent by the eNB to the MME;
encapsulate, within the S1-AP message, a Globally Unique Temporary Identity (GUTI) REALLOCATION REQUEST message, which includes the temporary identifier and the identifier for the MME, for the eNB to send to the UE;
communicate, to the eNB connected to the UE, the S1-AP message to cause the eNB to communicate the GUTI REALLOCATION REQUEST message, to the UE, via a Radio Resource Control (RRC) Downlink (DL) INFORMATION TRANSFER message; and
receive, from the eNB and in response to communicating the S1-AP message, a message confirming that the UE has acknowledged the temporary identifier.

24. The non-transitory computer-readable medium of claim 23, wherein the message confirming that the UE has acknowledged the temporary identifier includes a GUTI REALLOCATION COMPLETE message.

25. The non-transitory computer-readable medium of claim 23, wherein the request to transfer the UE is received from the other MME is based on:
a change in a geographical location of the UE within the wireless cellular network,
a quantity of UEs currently managed by the other MME,
a change in an availability of the other MME within the group of MMES,
a change in a quantity of MME within a group of MMEs, or
a change in a processing capacity allocated to the other MME.

26. The non-transitory computer-readable medium of claim 23, wherein the temporary identifier assigned by the MME includes an MME Temporary Mobile Subscriber Identity (M-TMSI).

* * * * *